Feb. 22, 1966     A. H. WILLINGER     3,236,206

PACKAGE FOR SHIPPING TROPICAL FISH

Filed Jan. 3, 1964

INVENTOR.
ALLAN H. WILLINGER
BY
Friedman & Goodman
ATTORNEYS

United States Patent Office 3,236,206
Patented Feb. 22, 1966

3,236,206
PACKAGE FOR SHIPPING TROPICAL FISH
Allan H. Willinger, New Rochelle, N.Y., assignor to Aquariums Incorporated, Maywood, N.J., a corporation of Delaware
Filed Jan. 3, 1964, Ser. No. 335,632
3 Claims. (Cl. 119—3)

This invention relates to the shipping of tropical fish from their natural habitat or from hatcheries and to a package for that purpose.

The tropical fish hobby is practiced under a wide variation in climatic conditions as well as through substantial seasonal variations in the environmental temperature of the aquaria in which they are kept. However such fishes are extremely sensitive to temperature variations beyond a relatively narrow range and means are usually provided in the form of heaters and the like for maintaining the aquarium temperature within the range most appropriate for the particular type of fish maintained therein. A wide variety of such fishes are imported from tropical waters and require comparable water temperature for continued viability. Hatcheries in which the fish are propagated are similarly located in areas providing warm climatic conditions. It is therefore essential that when the fishes are shipped or transported from their point of origin to localized distributors or pet shops from whence the fish are sold to hobbyists that they be not subjected to temperatures beyond the requisite range which in most cases has been determined to be between 70° F. to 85° F. Although shipments are made by air transportation and in thermally insulated containers, nevertheless, a considerable loss in fish life has been experienced due to the fact that the temperature at some time during the course of shipment has dropped below the lower limit. Thus, for example, if at any time the fish during the course of their transportation are subjected to a temperature of approximately 65° F. it will be found that the shipment will either arrive with the fish dead or that although the fish may be alive their condition has been so damaged that their life expectancy is extremely limited. It has frequently been found that fish which have been subjected to temperatures below their lower tolerance limits will arrive in live condition but almost immediately develop a number of fish diseases particularly those arising from fungus growths attached to the fish body. This loss of fish life in the course of transportation is to be deplored and is of course a significant commercial problem.

It is therefore an object of this invention to provide a packaging method and unit for the purpose of assuring the maintenance of the water in which the fish life is transported within the proper temperature range during the entire course of shipment regardless of variations in the environmental ambient temperature beyond the limits normally tolerated by the fish.

It is a further object of this invention to provide a method and arrangement whereby the fish are maintained in fully viable condition throughout the course of their transportation and are kept under environmental conditions which is most conducive to their arrival at the point of destination in essentially the same physical condition as existed at their point of origin.

In order to accomplish these and other objects, an arrangement is provided wherein a quantity of tropical fish together with an appropriate quantity of the water which comprises their natural habitat is deposited within a bag or container. The volume of water is limited so that it fills only a portion of the bag or container the remainder thereof being filled with pure oxygen and sealed. The bag or container of fish is then deposited within a shipping container which not only insulates the fish from the environment and changes thereof to which the shipping package will be subjected during the course of its transportation but additional means are provided for maintaining the temperature of the water within the bag within the range of tolerable limits for the particular fish life being transported. In the form of the invention herein described, a heat storage material is introduced into the shipping container and disposed in heat exchange material with the fish containing bag so that it may compensate for thermal variations to which the bag might otherwise be subjected.

These and other objects of this invention will be readily apparent to one skilled in the art from a consideration of the following specification taken in connection with the appended drawings.

Figure 1:
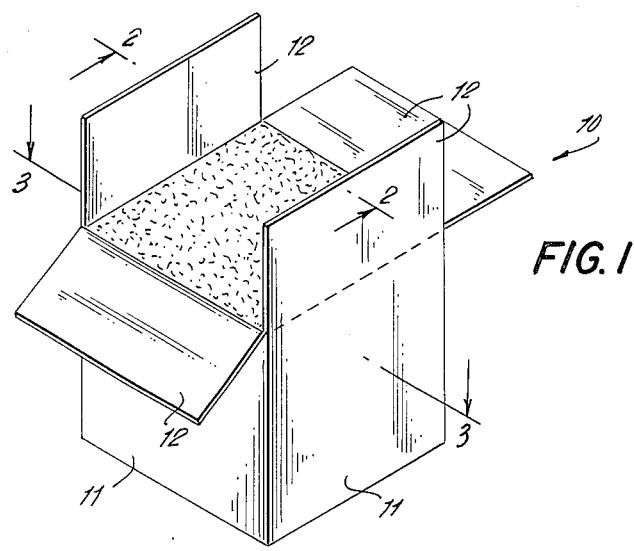
FIGURE 1 is a perspective view of a container in accordance with the present invention in open condition.
Figure 2:
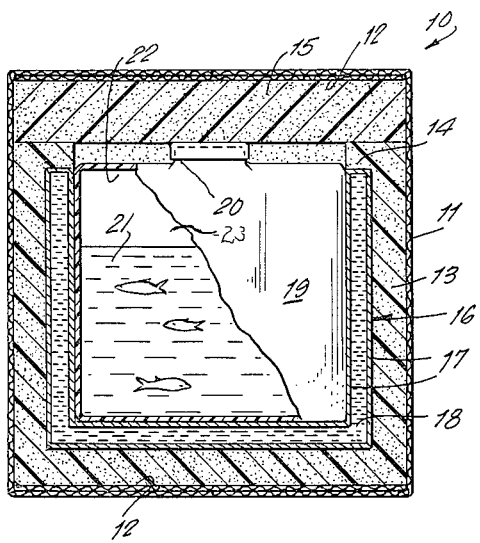
FIGURE 2 is a sectional view of the shipping container shown in FIGURE 1 taken along line 2—2 of FIGURE 1 showing the fish disposed within the container.
Figure 3:
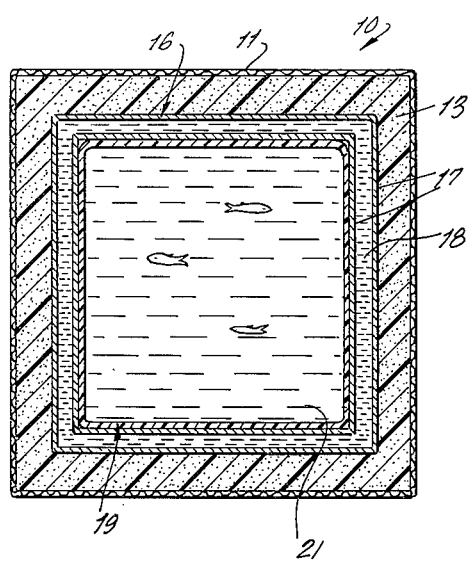
FIGURE 3 is a sectional view taken along line 3—3 of FIGURE 1.

As may be seen from the accompanying drawings as shown in FIGURES 1, 2 and 3, the tropical fish shipping package comprising the present invention is designated generally by the numeral 10. The package comprises an outer shell which may advantageously be in the form of a conventional corrugated cardboard shipping carton comprising the body portion 11 which forms a rectangular enclosure adapted to be closed by means of the flaps 12 after the carton has been filled. It will be understood that other forms of outer shells may be utilized such as those formed out of molded plastic or metal and that under some circumstances the outer shell may be dispensed with completely. The outer shell defines a generally rectangular container within which a liner or insert of heat insulating material is disposed. The liner comprises an open top body portion 13 which is in intimate contact with the interior wall surface of the carton 11 and is provided with a removable lid or cover portion 15. The liner is advantageously formed of a polyurethane foam or an expandible polystyrene. Both of these cellular materials provide excellent thermal insulation characteristics. It will be apparent however that other forms of thermal insulation material may be employed. The outer shell may be dispensed with under certain circumstances wherein the rigid wall characteristics of the urethane or polystyrene are sufficient to withstand the conditions under which the shipment is to be made. The lid 15 is formed of an identical insulation material and is removable so as to permit access to the interior of the liner and to complete the insulation thereof against heat exchange when disposed in overlying relation to the open mouth of the liner. Although the insulation material provided forms an effective heat barrier the efficiency of which is increased within limits by increasing the wall thickness nevertheless a certain amount of thermal loss is engendered particularly when the package is subjected to low temperature. Under these conditions, it is essential to provide a means for compensating for heat losses and for maintaining the temperature of the contents stabilized within the desired limits. For this purpose it is advantageous to employ an intermediate layer of a heat storage material. Such materials as sodium sulfate ($Na_2SO_4$), magnesium sulfate ($MgSO_4$) and water when mixed together can result in transition temperatures between 70 and 75° F. and are well known and described in the patented and technical art and will not be further described here. These materials depend upon the release of latent heat of fusion when changing from liquid to solid state and upon the absorption of heat during a change in the reverse direction. Materials which have a transition temperature within the range of 70° F. and 75° F. as well as other ranges are described for example in U.S. Patent No. 2,989,856, issued to M. Telkes, June 27, 1961.

The heat storage material 18 is introduced in liquid form into a pouch or receptacle designated generally by the numeral 16. This pouch may advantageously be formed of a flexible plastic sheet material and may take the form of a double walled polyethylene bag. The heat storage material 18 is introduced between the walls 17 of the pouch which is then sealed to prevent the escape of the material therefrom. When a double walled polyethylene bag is employed, it will be apparent that by reason of its flexibility it may readily be made to conform to the contours of the interior defined by the liner. An inwardly extending flange or lip 14 is provided on the interior walls of the liner adjacent the upper end thereof in order to form a convenient location for locking means to prevent the displacement of the heat storage pouch.

As has heretofore been stated, the tropical fish are gathered with a quantity of the water in which they have been bred or in which they propagate and live. This water designated by the numeral 21 is poured into a bag or bottle preferably formed of a flexible plastic material. It has been found advantageous to employ a polyethylene film bag for this purpose. It will be noted that the volume of water introduced into the bag is materially less than the volume which may be accommodated thereby. There thus remains a space unoccupied by water or fish. The fish containing bag may then be introduced into the interior of the assembled package and immediately prior to the complete tying, sealing or clamping of the bag mouth as indicated at 20, a quantity of pure oxygen 23 under pressure is introduced therein and displaces the air space formed above the water. By reason of this arrangement, there is provided a pure oxygen atmosphere within the fish bag to which the surface of the water is continuously exposed for oxygenation thereof. The agitation of the water in the course of shipment and transportation materially increases the amount of water surface area exposed to the oxygen atmosphere and consequently facilitates oxygenation thereof. In view of the flexibility of the film forming the bag, it will be apparent that the bag assumes the contour of the interior of the package and that it rests in intimate contact with the wall surfaces of the heat storage pouch 16. The intimate contact between the fish bag and the heat storage pouch results in a very efficient heat transfer arrangement over a maximum amount of surface area and thus provides for efficient and effective heat stabilization of the contents of the package. With the fish bag introduced into the package, the lid 15 is placed in position and the carton flaps closed as indicated in FIGURE 2. By this means the heat insulation of the package is completed and the package is now ready for shipment and transportation. Although it is preferred to maintain the orientation of the package in one direction during shipment, nevertheless, it often occurs that the package is variously disposed. The instant arrangement results in the constant maintenance of a substantial portion of the water filled volume of the fish bag in contact with the heat storage pouch for a high degree of heat transference regardless of the package orientation.

While I have illustrated and described the presently preferred embodiment of the invention, it will be apparent that various changes and modifications may be made therein without however departing from the basic inventive concept thereof as set forth in the appended claims.

I claim:

1. A package for the transportation and storage of tropical fish comprising a container having walls formed of a heat insulating material defining an enclosure, a flexible pouch of liquid heat storage material disposed along interior wall surfaces of said enclosure, said material having the property of changing state from a liquid to a solid and releasing its latent heat of fusion to its surroundings within the temperature range of 70–75° F., a flexible bag of water borne tropical fish disposed within said container and having a supply of oxygen contained therein, said bag being conformed to the conformation of the interior space defined in said container and being maintained in intimate heat exchange surface contact with the walls of said heat storage pouch over a substantial surface area during shipment or storage.

2. A package for the transportation and storage of tropical fish comprising a container having walls formed of a heat insulating material defining an enclosure, a flexible pouch of liquid heat storage material disposed along interior wall surfaces of said enclosure, said material having the property of releasing its latent heat of fusion when changing state from a liquid to a solid and of absorbing its heat of fusion when changing state from a solid to a liquid, a flexible bag of water borne tropical fish disposed within said container and having a supply of oxygen contained therein, said bag being conformed to the conformation of the interior space defined in said container and being maintained in intimate heat exchange surface contact with the walls of said heat storage pouch over a substantial surface area during shipment or storage, and an outer shell in which said container is disposed.

3. A package for the transportation and storage of tropical fish comprising a container having walls formed of a heat insulating material defining an enclosure, a flexible pouch of liquid heat storage material disposed along interior wall surfaces of said enclosure, said material having the property of releasing its latent heat of fusion when changing state from a liquid to a solid and of absorbing its heat of fusion when changing state from a solid to a liquid, a flexible bag of water borne tropical fish disposed within said container and having a supply of oxygen contained therein, said bag being conformed to the conformation of the interior space defined in said container and being maintained in intimate heat exchange surface contact with the walls of said heat storage pouch over a substantial surface area during shipment or storage, and an outer shell in which said container is disposed, said container having a recess defined therein in which said pouch is seated, and locking means to prevent the displacement of said pouch relative to said recess.

References Cited by the Examiner

UNITED STATES PATENTS

| | | | |
|---|---|---|---|
| 884,140 | 4/1908 | Erlwein et al. | 119—3 X |
| 1,843,038 | 1/1932 | McIlvain | 229—14 X |
| 2,149,412 | 3/1939 | Bangs | 119—5 X |
| 2,652,807 | 9/1953 | Washburn | 119—3 |
| 2,680,424 | 6/1954 | Brown | 119—3 |
| 2,763,239 | 9/1956 | Rendall | 119—5 |
| 2,949,882 | 8/1960 | Thomas | 119—3 |
| 2,989,856 | 6/1961 | Telkes | 62—371 |

SAMUEL KOREN, *Primary Examiner.*

ALDRICH F. MEDBERY, *Examiner.*